(12) United States Patent
John et al.

(10) Patent No.: US 8,285,516 B2
(45) Date of Patent: Oct. 9, 2012

(54) SYSTEMS, METHODS, AND APPARATUS FOR DETERMINING STEADY STATE CONDITIONS IN A GAS TURBINE

(75) Inventors: Justin V. John, Schenectady, NY (US); Scott William Szepek, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 261 days.

(21) Appl. No.: 12/834,929

(22) Filed: Jul. 13, 2010

(65) Prior Publication Data

US 2012/0016636 A1   Jan. 19, 2012

(51) Int. Cl.
*G06F 15/00* (2006.01)
(52) U.S. Cl. ........................................................ 702/182
(58) Field of Classification Search .................... 702/182
See application file for complete search history.

(56) References Cited

U.S. PATENT DOCUMENTS

2008/0071427 A1   3/2008   Szepek et al.

OTHER PUBLICATIONS

G.Bardone, Actuation System for Variable Exhaust Nozzle and Inlet Guide Vanes on an Advanced Gas Turbine Engine, May 11-15, 1998, p. 7-1 to 7-17.*

* cited by examiner

*Primary Examiner* — Tung S Lau
(74) *Attorney, Agent, or Firm* — Sutherland Asbill & Brennan LLP (57) ABSTRACT

Certain embodiments of the invention may include systems, methods, and apparatus for determining steady state conditions in a gas turbine. According to an example embodiment of the invention, a method for determining stability in a gas turbine is provided. The method can include receiving a guide vane (VGV) command and a fuel stroke reference (FSR) command associated with a gas turbine control system, determining a filtered VGV change based at least in part on the received VGV command, determining a filtered FSR change based at least in part on the received FSR command, and outputting a unit stability signal after a pickup delay time when the filtered VGV change is less than a predetermined VGV stability threshold and the filtered FSR change is less than a predetermined FSR stability threshold.

20 Claims, 4 Drawing Sheets

SYSTEMS, METHODS, AND APPARATUS FOR DETERMINING STEADY STATE CONDITIONS IN A GAS TURBINE

FIELD OF THE INVENTION

This invention generally relates to gas turbines, and in particular, to determining steady state conditions associated with the turbine.

BACKGROUND OF THE INVENTION

Gas turbines are typically large, complex, and expensive machines that operate under challenging environmental conditions. Building, maintaining, and operating these machines often requires a significant capital investment, and therefore, steps are often taken to ramp-up and ramp-down the turbines under careful control, in order to protect the capital investment, and operate the turbine within safe limits.

When a turbine is being ramped-up and brought on-line, certain parameters such as exhaust temperature, power output, airflow, and fuel flow, for example, can be measured to provide feedback for stabilizing the turbine. Such measured parameters may also be used to detect anomalous behavior or dangerous operating conditions that may require corrective action to avoid a costly malfunction. In many cases, the delay or lag time between the turbine operational variables and the associated measurable parameters may be too long to reliably and/or effectively act upon.

BRIEF SUMMARY OF THE INVENTION

Some or all of the above needs may be addressed by certain embodiments of the invention. Certain embodiments of the invention may include systems, methods, and apparatus for determining steady state conditions associated with the turbine.

According to an example embodiment of the invention, a method for determining stability in a gas turbine is provided. The method can include receiving a guide vane (VGV) command and a fuel stroke reference (FSR) command associated with a gas turbine control system, determining a filtered VGV change based at least in part on the received VGV command, determining a filtered FSR change based at least in part on the received FSR command, and outputting a unit stability signal after a pickup delay time when the filtered VGV change is less than a predetermined VGV stability threshold and the filtered FSR change is less than a predetermined FSR stability threshold.

According to another example embodiment, a system is provided for determining stability. The system can include a gas turbine, at least one memory for storing data and computer-executable instructions, and at least one processor configured to access the at least one memory. The at least one processor is further configured to execute the computer-executable instructions for receiving a guide vane (VGV) command and a fuel stroke reference (FSR) command associated with the gas turbine, determining a filtered VGV change based at least in part on the received VGV command, determining a filtered FSR change based at least in part on the received FSR command, and outputting a unit stability signal after a pickup delay time when the filtered VGV change is less than a predetermined VGV stability threshold and the filtered FSR change is less than a predetermined FSR stability threshold.

According to another example embodiment, an apparatus is provided for determining stability in a gas turbine. The apparatus can include at least one memory for storing data and computer-executable instructions. The apparatus can also include at least one processor configured to access the at least one memory and further configured to execute the computer-executable instructions for receiving a guide vane (VGV) command and a fuel stroke reference (FSR) command associated with a gas turbine, determining a filtered VGV change based at least in part on the received VGV command, determining a filtered FSR change based at least in part on the received FSR command, and outputting a unit stability signal after a pickup delay time when the filtered VGV change is less than a predetermined VGV stability threshold and the filtered FSR change is less than a predetermined FSR stability threshold.

Other embodiments and aspects of the invention are described in detail herein and are considered a part of the claimed inventions. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. Certain embodiments of the invention may enable determining steady state conditions in a gas turbine. According to example embodiments, certain control commands may be monitored to detect turbine stability.

In certain example embodiments of the invention, monitoring control commands instead of feedback parameters, for example, may provide certain advantages for determining if a turbine has reached stability or steady state. Feedback parameters such as exhaust temperature, power output, airflow, or fuel flow, for example, could be measured to provide feedback for determining the stability of the turbine. However, in many cases, there may be too long of a delay between the turbine operational variable and the associated measurable feedback parameters for the feedback to be responsive and/or effective. As an example, exhaust temperature may be one variable to consider as a variable for determining turbine stability. However, the turbine may actually be operating under stable condition minutes before such stability is reflected in the exhaust temperature. Therefore, according to example embodiments of the invention, commands associated with the fuel and guide vanes may be utilized a more direct measure of the turbine stability.

In certain example embodiments of the invention, turbine protection algorithms may need to know if the unit is at steady state before enabling their protection. Some of these algorithms may need be disabled before disturbances appear on output parameters such as pyrometer temperatures. According to example embodiments of the invention, a stability algorithm is provided. According to example embodiments, the algorithm may be robust and accurate enough to prevent false protective actions, and it may be fast enough to ensure stability is confirmed or disabled before certain output parameters are significantly affected.

According to example embodiments of the invention, various sensors, signal processors, stability detection modules, and controllers for detecting turbine stability will now be described with reference to the accompanying figures.

Figure 1:
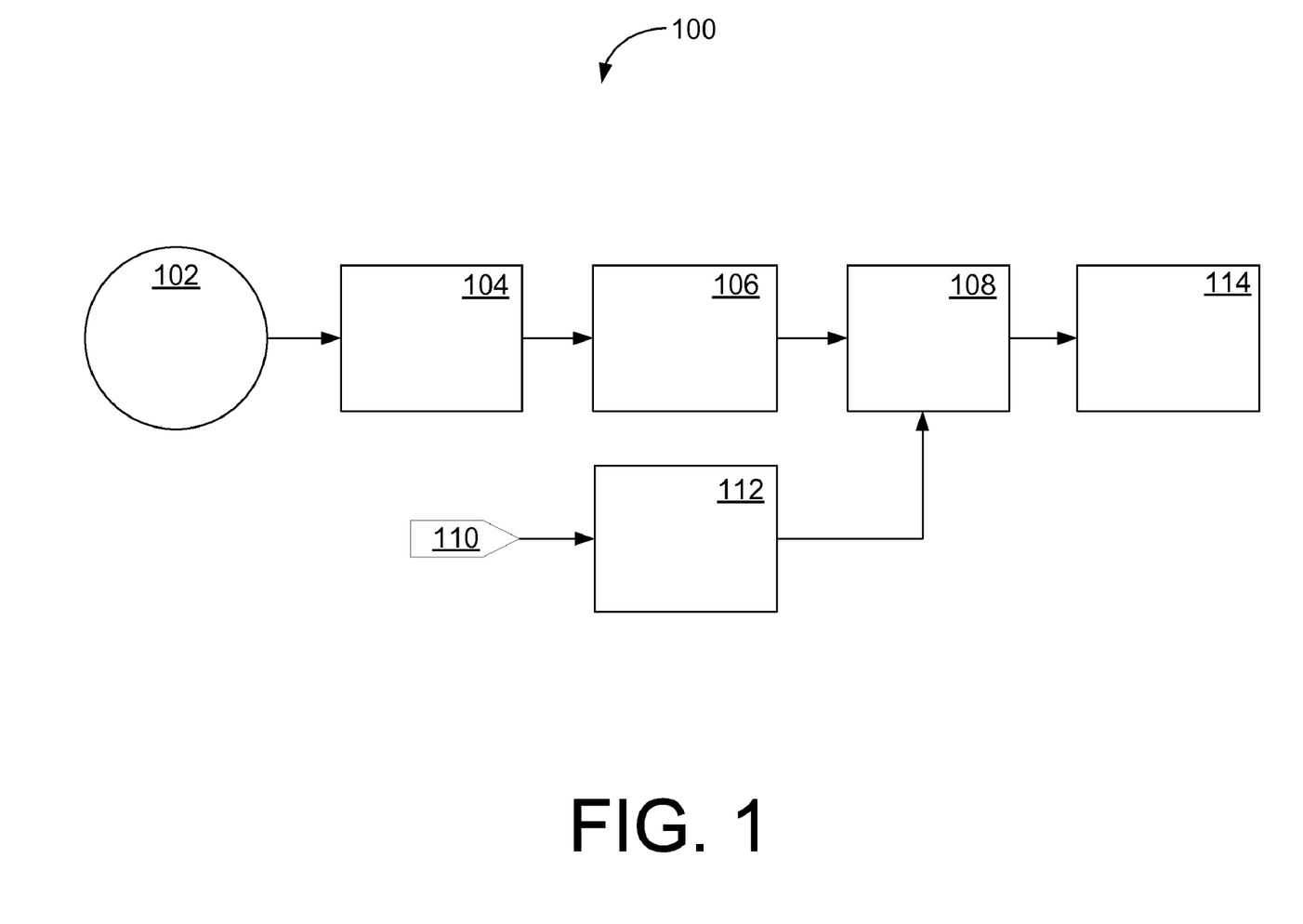
FIG. 1 is a block diagram of an illustrative turbine stability detection system according to an example embodiment of the invention.

FIG. 1 is a block diagram illustrating an example turbine stability detection system 100, according to example embodiments of the invention. The system 100 may include one or more sensor(s) 102 for measuring parameters, and/or events associated with the turbine. In an example embodiment, the sensors 102 may include linear variable differential transformers (LVDTs), pyrometer sensors, emissivity sensors, temperature sensors, gas sensors, pressure sensors, cameras, acoustical sensors, etc. The system 100 may also include one or more data capture modules 104 that may be configured to receive and condition the parameter information measured by the sensors 102. The data capture modules 104 may include analog to digital converters, level shifting, filtering, calibration, power supplies, etc., for proper communication with the sensors 102 and/or for conditioning the signals received from the sensors 102.

According to an example embodiment, the data capture module(s) 104 may communicate with a signal-processing module 106. In an example embodiment the signal-processing module 106 may further process the information received from the sensor(s) 102 via the data capture module(s) 104. For example, the signal-processing module 106 may average or filter the incoming data. In certain embodiments, the signal-processing module 106 may scale and/or format the data.

In certain example embodiments of the invention, some of the various operational modes of the gas turbine may be more suitable than others for determining events associated with possible failure. For example, when the turbine is being ramped-up, the measurable parameters (temperature, exhaust gasses, airflow, fuel flow, etc.) may be fluctuating normally, but may cause a false alarm or shutdown of the system. Therefore, according to an aspect of one embodiment of the invention, a stability detection 112 module may monitor turbine commands 110 to enable a protection module 108 only after certain criteria are met. For example, the stability detection module 112 may monitor turbine commands 110 to determine if the turbine has reached steady state operation, and/or if other criteria are met. In accordance with an example embodiment of the invention, the stability detection module 112 may inhibit the protection module 108 and keep it from initiating a shutdown of the system via the turbine controls 114 until after the stability criteria are met. For example, shutdown may be initiated upon detection of an event and after turbine has initialized or stabilized.

According to example embodiments of the invention, turbine commands 110 such as a variable guide vane (VGV) command or a fuel stroke reference (FSR) command may be monitored and utilized to determine stability of the turbine. In certain example embodiments of the invention, the stability detection block 112 may accept multiple inputs and variable parameters, thresholds, etc. for determining the stability of the turbine.

Figure 2:
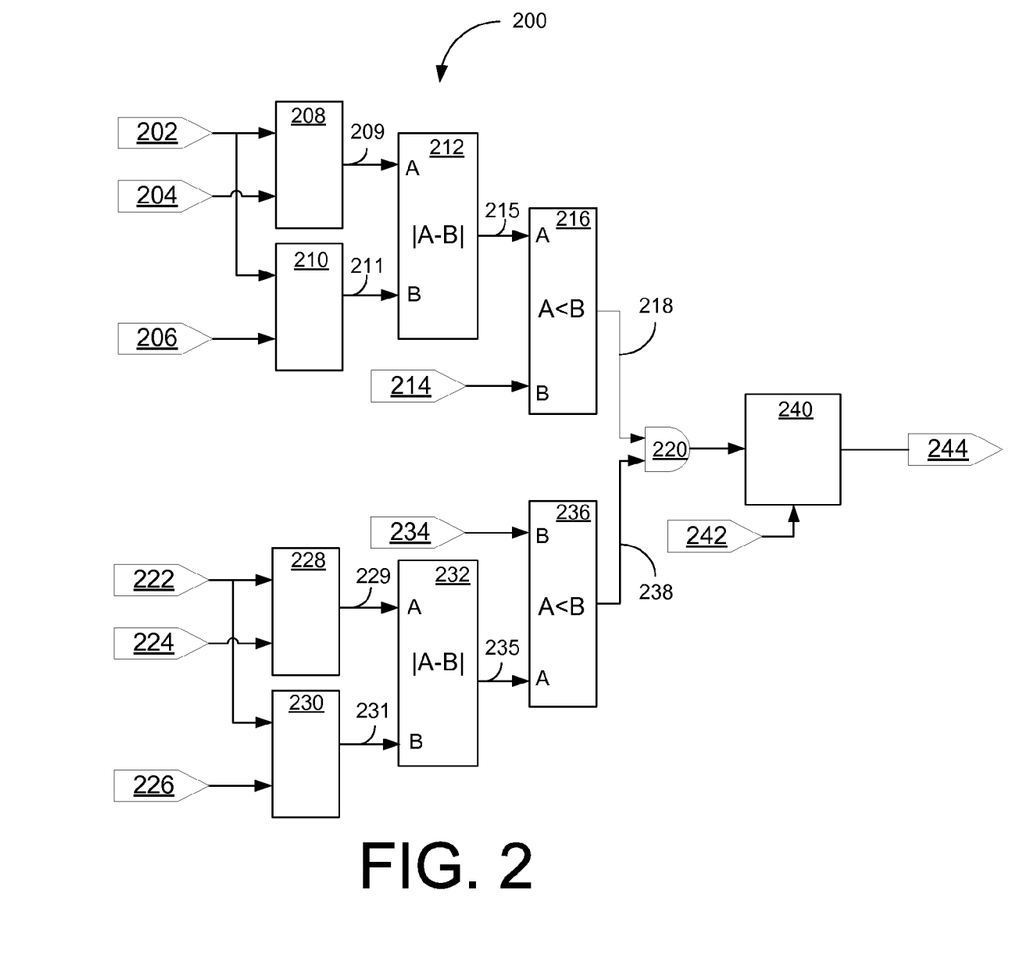
FIG. 2 is an example stability detection block diagram according to an example embodiment of the invention.

FIG. 2 depicts a stability detection block diagram 200, according to example embodiments of the invention. Embodiments of the invention may utilize a variable guide vane (VGV) command 202 and a fuel stroke reference (FSR) command 222 and as inputs. According to example embodiments, fuel and air may be considered main variables that respond to grid fluctuations, load changes and other disturbances to the turbine. In certain example embodiments, fuel and air commands can be processed to determine stability before there is a relatively significant change in parameters such as exhaust temperature, pyrometer temperatures, spreads or wattage output of the turbine. In accordance with an example embodiment of the invention, the stability detection block diagram 200 includes a number of inputs for receiving commands and variables, and several blocks for processing the inputs. According to an example embodiment of the invention, inputs related to the variable guide vane (VGV) may include a VGV command 202, a VGV lag time constant 204, a VGV moving average time constant 206, and a VGV stability threshold 214. According to an example embodiment of the invention, inputs related to the fuel stroke reference (FSR) may include a FSR command 222, a FSR lag time constant 224, a FSR moving average time constant 226, and a FSR stability threshold 234.

In accordance with an example embodiment of the invention, the VGV command 202 may be fed into a first order lag block 208 and a moving average block 210. A VGV lag time constant 204 may be utilized to set the parameters of the first order lag block 208, and a VGV moving average time constant 206 may be used to set the time constant for the moving average block 210. According to example embodiments of the invention, the first order lag block 208 may process the input VGV command 202, and the VGV lag output 209 may be based at least in part on the following Laplace transform: $Y(s)=1/(\tau*s+1)$, where $\tau$ is equal to the VGV lag time constant 204. In accordance with certain example embodiments of the invention, the VGV lag output 209 may be based at least in part on the VGV lag time constant 204 ranging from about 15 seconds to about 300 seconds.

In certain example embodiments of the invention, the VGV command 202 may also be processed by the moving average block 210 according to the VGV moving average time constant 206, resulting in a VGV moving average output 211. According to an example embodiment, the VGV moving average output 211 may be based at least in part on the VGV moving average time constant 206 ranging from about 0.25 seconds to about 5 seconds. In an example embodiment, the VGV lag output 209, and the VGV moving average output 211 may be compared by block 212 to obtain an absolute value of the difference between the inputs, and the resulting VGV difference 215 may be used as input to an evaluation block 216, and compared to a VGV stability threshold 214. For example, if the difference between the VGV lag output 209 and the VGV moving average output 211 is less than the VGV stability threshold 214, then a logic high VGV stability signal 218 may be generated by the evaluation block 216. In certain example embodiments, the VGV stability threshold 214 may range from about 0.25 degrees to about 3 degrees. In certain embodiments of the invention, the first order lag may be a slowly varying signal that may provide a moving reference for which to compare the quickly moving changes in the moving average signal.

An analogous process as described above may be carried out for the fuel stroke reference (FSR) command 222. For example, FSR command 222 may be fed into a first order lag block 228 and a moving average block 230. A FSR lag time constant 224 may be utilized to set the parameters of the first order lag block 228, and a FSR moving average time constant 226 may be used to set the time constant for the moving average block 230. According to example embodiments of the invention, the first order lag block 228 may process the input FSR command 222, and the FSR lag output 229 may be based at least in part on the following Laplace transform: $Y(s)=1/(\tau*s+1)$, where $\tau$ is equal to the FSR lag time constant 224. The FSR command 222 may also be processed by the moving average block 230 according to the FSR moving average time constant 226, resulting in a FSR moving average output 231. In an example embodiment, the FSR moving average 231 may be based at least in part on a FSR moving average time constant 226 ranging from about 0.25 seconds to about 5 seconds. In an example embodiment, the FSR lag output 229 may be based at least in part on a FSR lag time constant 224 ranging from about 15 seconds to about 300 seconds. In an example embodiment, the FSR lag output 229 and the FSR moving average output 231 may be compared by block 232 to obtain an absolute value of the difference between the inputs, and the resulting FSR difference 235 may be used as input to an evaluation block 236, and compared to a FSR stability threshold 234. For example, if the difference between the FSR lag output 229 and the FSR moving average output 231 is less than the FSR stability threshold 234, then a logic true FSR stability signal 238 may be generated by the evaluation block 236. In certain example embodiments of the invention, the FSR stability threshold 234 may range from about 0.25 percent to about 4 percent.

According to example embodiments, an AND block 220 may be utilized to evaluate the VGV stability signal 218 and the FSR stability signal 238. If both of these signals are logic true, then the output of the AND block 220 may go true, indicating unit stability. In accordance with an example embodiment of the invention, an additional variable delay block 240 may be utilized to de-bounce or further delay the unit stability signal 244 going true (after the AND block 220 has produced a true output) until after a certain variable pickup time delay 242 has elapsed. In accordance with example embodiments of the invention, the variable pickup delay time 242 may be set based upon the mode of protection for the unit, or upon parameters such as exhaust temperature, pyrometer temperatures, spreads or wattage output of the turbine. In certain example embodiments of the invention, the pickup delay time 242 may ranges from about 30 seconds to about 10 minutes.

Figure 3:
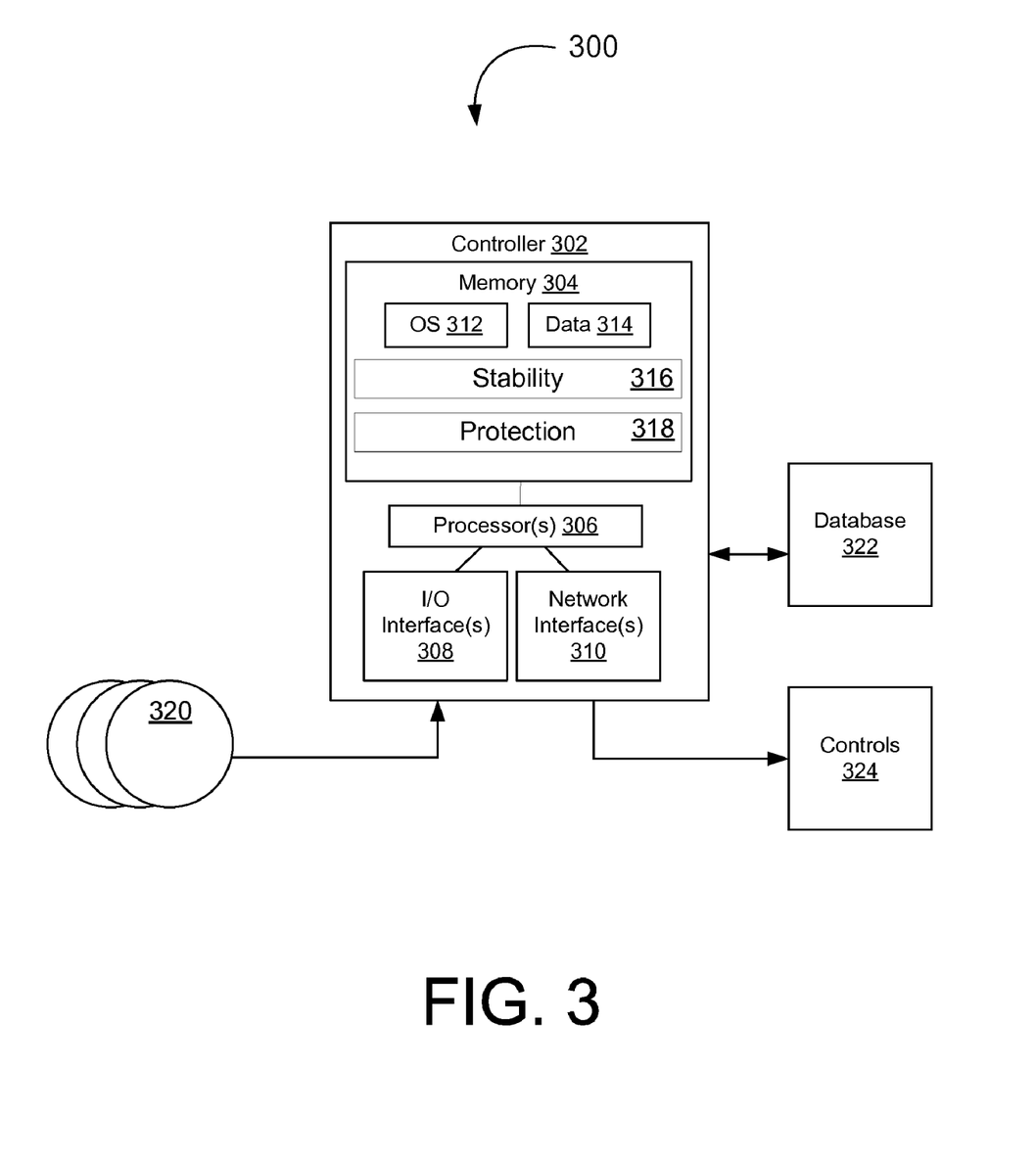
FIG. 3 is a turbine stability detection control system according to an example embodiment of the invention.

FIG. 3 depicts a block diagram of turbine stability detection control system 300, according to an example embodiment of the invention. According to an example embodiment, the system 300 may include a controller 302, which may include a memory 304, one or more processors 306, and input/output interfaces 308. In certain example embodiments, the controller 302 may include one or more network interfaces 310. In an example embodiment, the memory 304 may include an operating system 312, data 314, and various special purpose modules. In example embodiments of the invention, the turbine stability detection control system 300 may receive signals from various sensors 320, and may be utilized to sending control signals to the turbine controls 324. In an example embodiment, a database 322 may communicate with the controller 302 to store and retrieve data or processing variables.

In an example embodiment, the memory 302 may include a stability module 316 (such as 112 in FIG. 1) configured or programmed to carry out operations including comparisons, logic, delays, and other functions as previously discussed with reference to FIG. 2. According to an example embodiment, the memory 304 may also include a protection module 318 (which can be similar to 108 in FIG. 1.) The protection module 318 may receive information from the stability module 316 or sensors 320, and may utilize this information in conjunction with instructions from a stability module 316 to initiate shutdown of the turbine when certain criteria are met. For example, the stability module 318 may monitor the output of the stability module 316 to determine if the turbine has reached steady state operation. In accordance with an example embodiment of the invention, the stability module 316 may inhibit the protection module 318 and keep it from initiating a shutdown of the system via the turbine controls 324 until after the stability criteria are met, and/or certain event criteria have been met. For example, shutdown may be initiated upon detection of the event and after fuel and/or guide vane commands associated with the turbine have stabilized.

Figure 4:
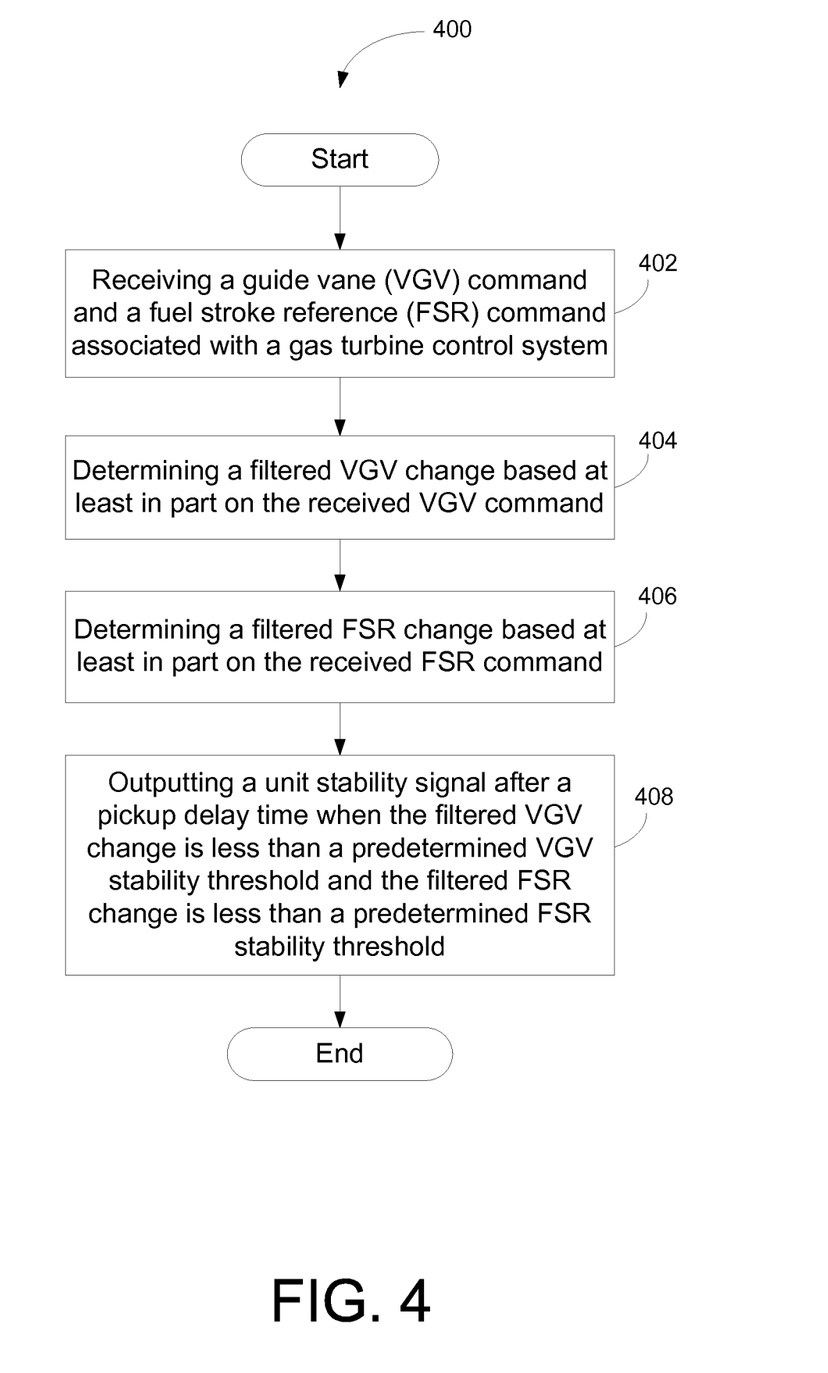
FIG. 4 is a flow diagram of an example method according to an example embodiment of the invention.

An example method for detecting stability in a gas turbine will now be described with reference to the flowchart of FIG. 4. The method 400 starts in block 402, where according to an example embodiment of the invention, the method 400 includes receiving a guide vane (VGV) command and a fuel stroke reference (FSR) command associated with a gas turbine control system. In block 404, the method 400 includes determining a filtered VGV change based at least in part on the received VGV command. In block 406, the method 400 includes determining a filtered FSR change based at least in part on the received FSR command. In block 408, the method 400 includes outputting a unit stability signal after a pickup delay time when the filtered VGV change is less than a predetermined VGV stability threshold and the filtered FSR change is less than a predetermined FSR stability threshold. The method 400 ends after block 408.

Accordingly, example embodiments of the invention can provide the technical effects of creating certain systems, methods, and apparatus that provide detection of stability associated with a turbine. Example embodiments of the invention can provide the further technical effects of providing systems, methods, and apparatus for detecting stability of a turbine based on fuel commands and/or guide vane commands associated with the turbine. Example embodiments of the invention can provide the further technical effects of providing systems, methods, and apparatus for avoiding unnecessary shutdown of a turbine during startup.

In example embodiments of the invention, the turbine stability detection system 100 and/or the turbine stability detection control system 300 may include any number of hardware and/or software applications that are executed to facilitate any of the operations.

In example embodiments, one or more I/O interfaces may facilitate communication between the turbine stability detection system 100 and/or the turbine stability detection control system 300, and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the turbine stability detection system 100 and/or the turbine stability detection control system 300. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the turbine stability detection system 100 and/or the turbine stability detection control system 300 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network, any wired network, any wireless network, etc., for communication with external devices and/or systems.

As desired, embodiments of the invention may include the turbine stability detection system 100 and/or the turbine stability detection control system 300 with more or less of the components illustrated in FIGS. 1 and 3.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for determining stability in a gas turbine, comprising:
   receiving a guide vane (VGV) command and a fuel stroke reference (FSR) command associated with a gas turbine control system;
   determining a filtered VGV change based at least in part on the received VGV command;
   determining a filtered FSR change based at least in part on the received FSR command; and,
   outputting from a processor unit stability signal after a pickup delay time when the filtered VGV change is less than a predetermined VGV stability threshold and the filtered FSR change is less than a predetermined FSR stability threshold.

2. The method of claim 1, wherein determining the filtered VGV change comprises determining a difference between a VGV lag and a VGV moving average, and wherein determining the filtered FSR change comprises determining a difference between a FSR lag and a FSR moving average.

3. The method of claim 2, wherein the VGV lag is based at least in part on a VGV lag time constant ranging from about 15 seconds to about 300 seconds, and wherein the VGV moving average is based at least in part on a VGV moving average time constant ranging from about 0.25 seconds to about 5 seconds.

4. The method of claim 2, wherein the FSR lag is based at least in part on a FSR lag time constant ranging from about 15 seconds to about 300 seconds, and wherein the FSR moving average is based at least in part on a FSR moving average time constant ranging from about 0.25 seconds to about 5 seconds.

5. The method of claim 2, wherein the VGV lag and the FSR lag are first order lags based on the following equation: $Y(s)=1/(\tau*s+1)$ where $\tau$ is equal to the FSR or VGV lag time constant.

6. The method of claim 1, wherein the VGV stability threshold ranges from about 0.25 degrees to about 3 degrees.

7. The method of claim 1, wherein the FSR stability threshold ranges from about 0.25 percent to about 4 percent.

8. The method of claim 1, wherein the pickup delay time ranges from about 30 seconds to about 10 minutes and is selectable based at least in part on a protection mode.

9. A system for determining stability, comprising:
   a gas turbine;

at least one memory for storing data and computer-executable instructions; and, at least one processor configured to access the at least one memory and further configured to execute the computer-executable instructions for:

receiving a guide vane (VGV) command and a fuel stroke reference (FSR) command associated with the gas turbine;

determining a filtered VGV change based at least in part on the received VGV command;

determining a filtered FSR change based at least in part on the received FSR command; and, outputting a unit stability signal after a pickup delay time when the filtered VGV change is less than a predetermined VGV stability threshold and the filtered FSR change is less than a predetermined FSR stability threshold.

10. The system of claim 9, wherein the at least one processor is further configured to determine a filtered VGV change comprising a difference between a VGV lag and a VGV moving average, and wherein the at least one processor is further configured to determine a filtered FSR change comprising a difference between a FSR lag and a FSR moving average.

11. The system of claim 10, wherein the VGV lag is based at least in part on a VGV lag time constant ranging from about 15 seconds to about 300 seconds, and wherein the VGV moving average is based at least in part on a VGV moving average time constant ranging from about 0.25 seconds to about 5 seconds.

12. The system of claim 10, wherein the FSR lag is based at least in part on a FSR lag time constant ranging from about 15 seconds to about 300 seconds, and wherein the FSR moving average is based at least in part on a FSR moving average time constant ranging from about 0.25 seconds to about 5 seconds.

13. The system of claim 10, wherein the at least one processor is further configured to determine the VGV lag and the FSR lag based at least in part on the following equation: $Y(s)=1/(\tau*s+1)$ where $\tau$ is equal to the FSR or VGV lag time constant.

14. The system of claim 9, wherein the VGV stability threshold ranges from about 0.25 degrees to about 3 degrees, and wherein the FSR stability threshold ranges from about 0.25 percent to about 4 percent.

15. The system of claim 9, wherein the pickup delay time ranges from about 30 seconds to about 10 minutes and is selectable based at least in part on a protection mode.

16. An apparatus for determining stability in a gas turbine, comprising:

at least one memory for storing data and computer-executable instructions; and, at least one processor configured to access the at least one memory and further configured to execute the computer-executable instructions for:

receiving a guide vane (VGV) command and a fuel stroke reference (FSR) command associated with a gas turbine;

determining a filtered VGV change based at least in part on the received VGV command;

determining a filtered FSR change based at least in part on the received FSR command; and, outputting a unit stability signal after a pickup delay time when the filtered VGV change is less than a predetermined VGV stability threshold and the filtered FSR change is less than a predetermined FSR stability threshold.

17. The apparatus of claim 16, wherein the at least one processor is further configured to determine a filtered VGV change comprising a difference between a VGV lag and a VGV moving average, and wherein the at least one processor is further configured to determine a filtered FSR change comprising a difference between a FSR lag and a FSR moving average, and wherein the VGV lag is based at least in part on a VGV lag time constant ranging from about 15 seconds to about 300 seconds, and wherein the VGV moving average is based at least in part on a VGV moving average time constant ranging from about 0.25 seconds to about 5 seconds, and wherein the FSR lag is based at least in part on a FSR lag time constant ranging from about 15 seconds to about 300 seconds, and wherein the FSR moving average is based at least in part on a FSR moving average time constant ranging from about 0.25 seconds to about 5 seconds.

18. The apparatus of claim 17, wherein the at least one processor is further configured to determine the VGV lag and the FSR lag based at least in part on the following equation: $Y(s)=1/(\tau*s+1)$ where $\tau$ is equal to the FSR or VGV lag time constant.

19. The apparatus of claim 16, wherein the VGV stability threshold ranges from about 0.25 degrees to about 3 degrees, and wherein the FSR stability threshold ranges from about 0.25 percent to about 4 percent.

20. The apparatus of claim 16, wherein the pickup delay time ranges from about 30 seconds to about 10 minutes and is selectable based at least in part on a protection mode.

* * * * *

UNITED STATES PATENT AND TRADEMARK OFFICE
CERTIFICATE OF CORRECTION

| | | |
|---|---|---|
| PATENT NO. | : 8,285,516 B2 | |
| APPLICATION NO. | : 12/834929 | |
| DATED | : October 9, 2012 | |
| INVENTOR(S) | : Justin V. John et al. | |

It is certified that error appears in the above-identified patent and that said Letters Patent is hereby corrected as shown below:

Column 8, Line 34, Claim 1 – Change "from a processor" to --a--

Signed and Sealed this
Twenty-fifth Day of December, 2012

David J. Kappos
*Director of the United States Patent and Trademark Office*